United States Patent [19]

Uchino et al.

[11] Patent Number: 4,907,265
[45] Date of Patent: Mar. 6, 1990

[54] TELEPHONE SET WITH A MECHANISM FOR PREVENTING UNWANTED DISPLACEMENTS

[75] Inventors: Yasuhito Uchino, Hino; Tsuneo Tomita, Kunitachi; Hiroshi Morikawa, Hino, all of Japan

[73] Assignee: Kabushiki Kaisha Toshiba, Kawasaki, Japan

[21] Appl. No.: 191,120

[22] Filed: May 4, 1988

Related U.S. Application Data

[63] Continuation of Ser. No. 840,785, Mar. 18, 1986, Pat. No. 4,782,526.

[30] Foreign Application Priority Data

Aug. 30, 1985 [JP] Japan .................................. 60-191214

[51] Int. Cl.⁴ ........................ H04M 1/06; H04M 1/02; H04M 1/04
[52] U.S. Cl. .................................. 379/417; 379/422; 379/425; 379/426; 379/427; 379/437; 379/445; 379/448; 379/451
[58] Field of Search ............... 379/419, 422, 423, 424, 379/425, 426, 427, 437, 440, 445, 448, 451

[56] References Cited

U.S. PATENT DOCUMENTS

| | | | |
|---|---|---|---|
| 4,476,354 | 10/1984 | Uchino et al. | 379/424 |
| 4,609,790 | 9/1986 | Kaiwa et al. | 379/445 |
| 4,700,383 | 10/1987 | Takagi et al. | 379/421 |
| 4,723,281 | 2/1988 | Pei Ker et al. | 379/433 |

Primary Examiner—Jin F. Ng
Assistant Examiner—Danita R. Byrd
Attorney, Agent, or Firm—Finnegan, Henderson, Farabow, Garrett and Dunner

[57] ABSTRACT

An improved telephone set of the type including a telephone body and a handset adapted to be placed on the former wherein the telephone set includes features which prevents displacement of the handset from the telephone body. The telephone body has a pair of engagement blocks incorporated therein of which part is projected outwardly of the telephone body and they are fitted into engagement recesses on the handset whereby the latter is firmly placed on the telephone body. At least the one engagement block has an engagement face which is adapted to come in contact with the engagement portion in the corresponding engagement recess, wherein each engagement block includes a pawl portion. Displacement of the handset occurs by displacing one of the pawl portions out of its respective engagement recess followed by displacement of the handset in a second direction which is different from the first direction which causes the displacement of the other pawl portion out of its respective engagement recess. Thus, the handset is reliably held on the telephone body.

3 Claims, 9 Drawing Sheets

TELEPHONE SET WITH A MECHANISM FOR PREVENTING UNWANTED DISPLACEMENTS

This is a continuation of application Serial No. 840,785, filed March 18, 1986 now U.S. Pat. 4,782,526.

BACKGROUND OF THE INVENTION

1. Field of the Invention

The present invention relates to a telephone set of the type including a telephone body and a handset adapted to be placed in position on the former and more particularly to improvement of or relation to a telephone of the abovementioned type which assures that the handset is firmly held on the telephone body in order that it is not easy to fall down from the latter.

2. Description of the Prior Art

Figure 1:
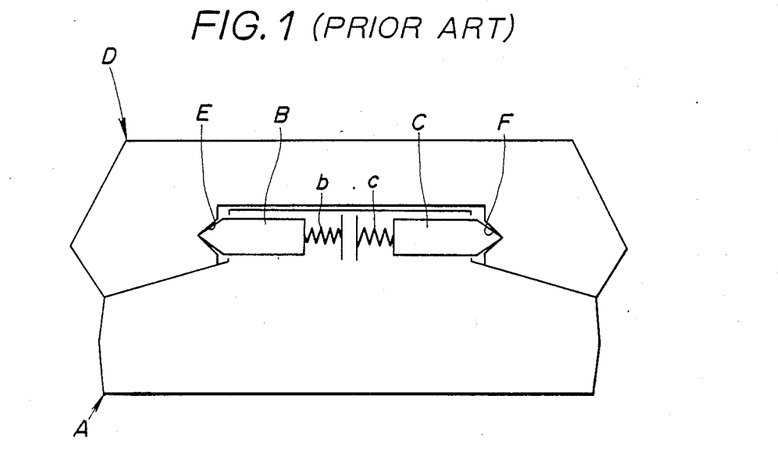
FIG. 1 is a schematic side view of a conventional telephone of the type including a telephone body and a handset.

To facilitate understanding of the present invention it will be helpful that a typical conventional telephone of the above-mentioned type will be briefly described with reference to FIG. 1 which is a schematic side view of a telephone adapted to be mounted on a motorcar (hereinafter referred to simply as telephone). The telephone has a pawl B and a pawl C incorporated in a telephone body A and both the pawl B and C are biased in the opposite direction under the effect of resilient force of springs b and c. As is apparent from the drawing, the foremost ends of the pawls B and C are fitted into recesses E and F which are formed on the handset D whereby the latter is firmly held on the telephone body A.

In order to inhibit the handset D held on the telephone body from rattling or falling down from the latter during running of a motorcar under the vibratory condition there is a necessity for allowing the pawls B and C to be thrusted against the recesses E and F on the handset D with a high intensity of resilient force. However, the fact that an intensity of thrusting force of the pawls B and C against the handset D, that is, an intensity of urging force of the pawls B and C is determined to a high level means that a high intensity of manual force is required when the handset D is placed in position on the telephone body A or when the handset D is removed or taken up from the telephone body A. As a result, the telephone is difficult or troublesome to operate. Since an arrangement is made such that the two pawls B and C are urged with a high intensity of resilient force, it is unavoidably necessary that both the springs b and c are designed in larger dimensions. This leads to a necessity for a wide hollow space in the interior of the telephone body A so as to allow the larger springs b and c to be accommodated therein. This means that the whole telephone become larger.

SUMMARY OF THE INVENTION

Thus, the present invention has been made with the foregoing background in mind and its object resides in providing an improved telephone of the early-mentioned type which assures that a handset properly held on a telephone body is reliably inhibited from falling down from the latter and the handset is placed on and taken up from the telephone body with a lower intensity of manual force.

Another object of the present invention is to provide an improved telephone of the early mentioned type which is designed in smaller dimensions.

To accomplish the above objects there is proposed according to the present invention a telephone of the type including a handset which is formed with a holding recess in the central area thereof, the holding recess having faces oppositely located to one another each of the faces being formed with an engagement recess, and a telephone body which is integrally formed with a projected portion having the trapezoidal configuration as seen from the side, the projected portion being adapted to be fitted into the holding recess of the handset, both the end faces of the projected portion including first and second engagement blocks adapted to be fitted into the engagement recesses of the handset, the first and second engagement blocks being biased in the opposite direction under the effect of resilient force of spring means, wherein the improvement consists in that at least the first engagement block is disposed so as to move in the direction at a substantially right angle relative to the direction of mounting and dismounting of the handset on and from the telephone body and moreover it is formed with an engagement face on the bottom thereof which extends in the direction of movement of the first engagement block and that the engagement recess is formed with an engagement portion adapted to come in contact with the engagement face of the engagement block, the position of the engagement portion being so determined that it is located in alignment with the engagement face of the first engagement block when the latter is fitted into the engagement recess on the handset. By virtue of the arrangement made in that way it is assured that the handset is reliably held on the telephone body. Since holding of the handset is achieved mainly by cooperation of the engagement face with the engagement portion, there is no necessity for a high intensity of urging force for actuating the first and second engagement blocks. Thus, small-sized urging means such as coil spring or the like can be used for the purpose of actuating the engagement blocks, resulting in the whole telephone being designed and constructed in smaller dimensions.

Other objects, features and advantages of the present invention will become readily apparent from reading of the following description which has been prepared in conjunction with the accompanying drawings.

BRIEF DESCRIPTION OF THE DRAWINGS

The accompanying drawings will be briefly described below.

DETAILED DESCRIPTION OF THE PREFERRED EMBODIMENTS

Now, the present invention will be described in a greater detail hereunder with reference to the accompanying drawings which illustrate preferred embodiments thereof.

Figure 2:
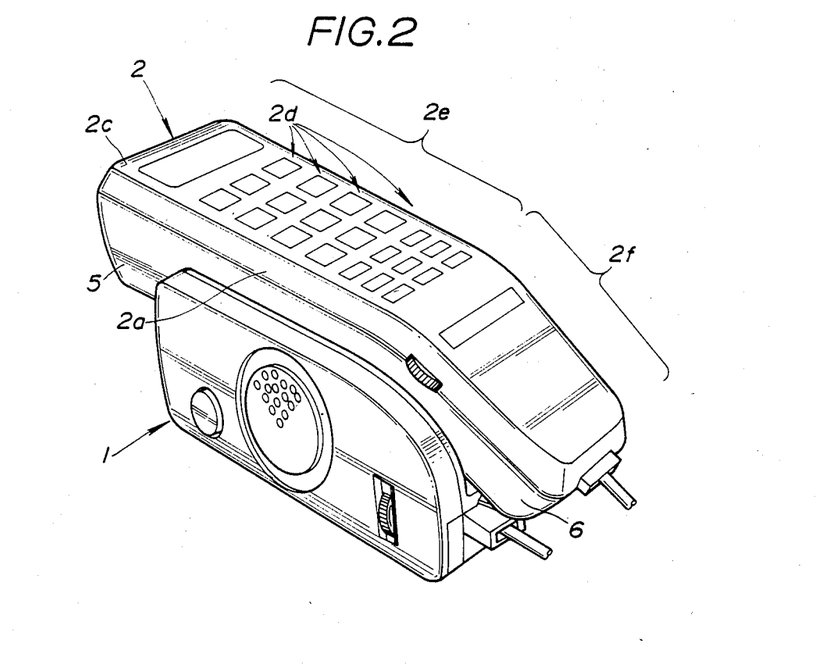
FIG. 2 is a perspective view of a telephone of the above-mentioned type in accordance with the present invention, particularly showing an appearance of the whole structure of the telephone handset of which is held in position of the telephone body.
Figure 3:
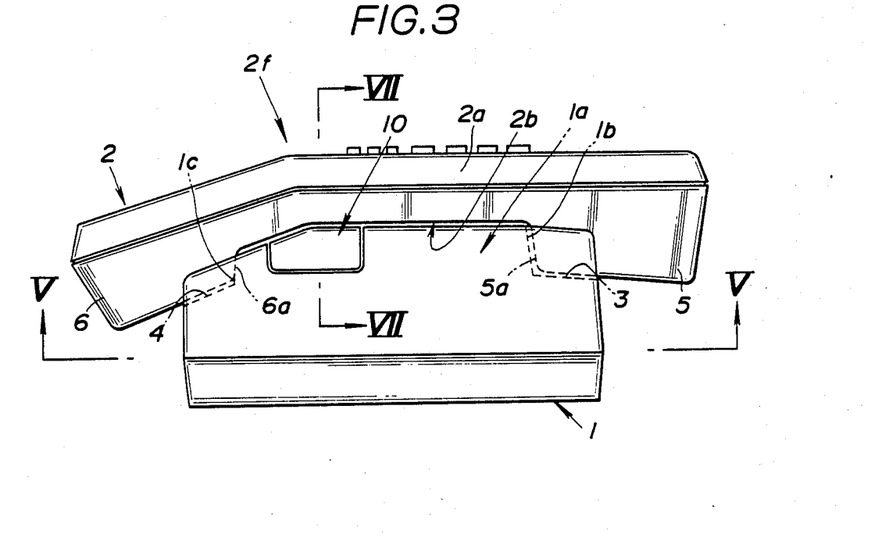
FIG. 3 is a side view of the telephone in FIG. 2.
Figure 4:
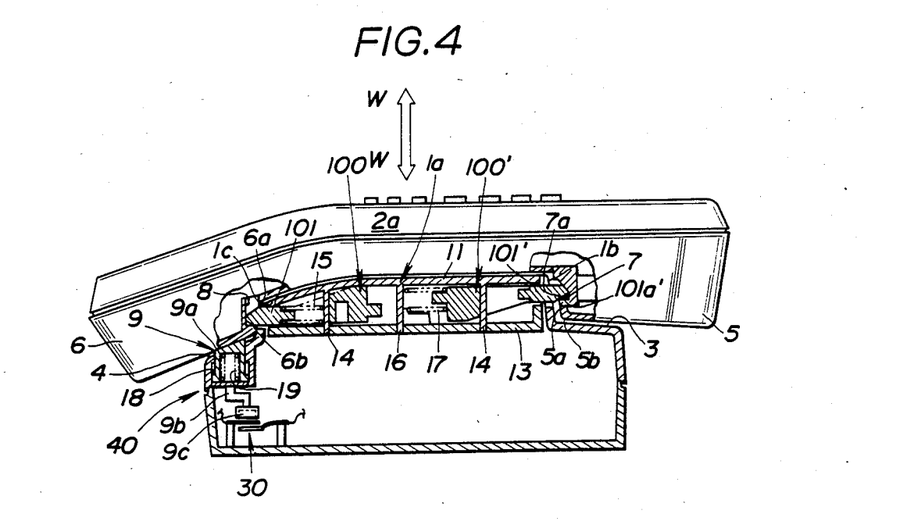
FIG. 4 is a partially sectioned side view of the telephone in accordance with an embodiment of the invention, particularly illustrating how essential components constituting the telephone are arranged.

First, referring to FIGS. 2 and 4, the telephone of the invention includes a telephone body 1 and a handset 2. The telephone body 1 is integrally formed with a projected portion 1a having the trapezoidal configuration as seen from the side on its upper central part and moreover it includes a telephone receiving side cradle 3 on the right-hand side and a telephone sending side cradle 4 on the left-hand side of the trapezoidal projected portion 1a (as seen in FIGS. 3 and 4). The cradle 4 is provided with a first engagement block 100 on the one end face 1c of the projected portion 1a so as to allow an engagement pawl 101 to be projected therefrom, whereas the cradle 3 is provided with a second engagement block 100' on the other end face 1b of the projected portion 1a so as to allow an engagement pawl 101' to be projected therefrom. On the other hand, the handset 2 includes a telephone receiving section 5, a telephone sending section 6 and a junction section 2a by way of which the receiving section 5 and the sending section 6 are jointed to one another whereby a holding recess 2b is formed by the combination of receiving section 5, sending section 6 and junction section 2a. Further, the handset 2 has oppositely located faces in the holding recess 2b, one of the oppositely located faces being an inside face 5a of the receiving section 5 and the other one being an inside face 6a of the sending section 6. The inside face 5a of the receiving section 5 is formed with an engagement recess 7, whereas the inside face 6a of the sending section 6 is formed with an engagement recess 8. As will be apparent from FIG. 4, the handset 2 is held on the body 1 by fitting the pawls 101 and 101' of the engagement blocks 100 and 100' into the engagement recesses 7 and 8. At this moment the central part of the trapezoidal projected portion 1a is received in the hollow space as defined by the holding recess 2b of the handset 2. The handset 2 has a rear face 2c located opposite to the holding recess 2b and a control portion 2e with a number of control buttons 2d arranged thereon disposed in the area located on the left-hand side as seen in FIG. 2 (on the right-hand side as seen in FIGS. 3 and 4) on the rear face 2c. Further, the handset 2 includes a grasping portion 2f in the area located on the right-hand side as seen in FIG. 2 so as to allow the handset 2 to be easily grasped by an operator. As shown in FIG. 4, a hook button 9 is accommodated in the sending side cradle 4 of the telephone body 1. Further, as shown in FIG. 3, the telephone body 1 is provided with an unlocking button 10 which will be described later in more details on the upper part of the side wall of the telephone body 1. It should be noted that the handset 2 is placed on the telephone body 1 at such a properly determined position that operator's fingers can reach the lower area of the grasping portion 2f, that is, an operator can take up the hand set 2 from the telephone body 1.

Incidentally, the pair of engagement blocks 100 and 100' disposed on both the side faces 1b and 1c of the trapezoidal portion 1a of the telephone body 1 are designed in the same structure. Since both the engagement blocks 100 and 100' function in the same manner, the same components constituting the engagement block 100 as those of the engagement block 100' are identified by the same reference numerals with a prime mark attached thereto respectively and their detailed description with respect to function and structure will not be required.

Figure 5:
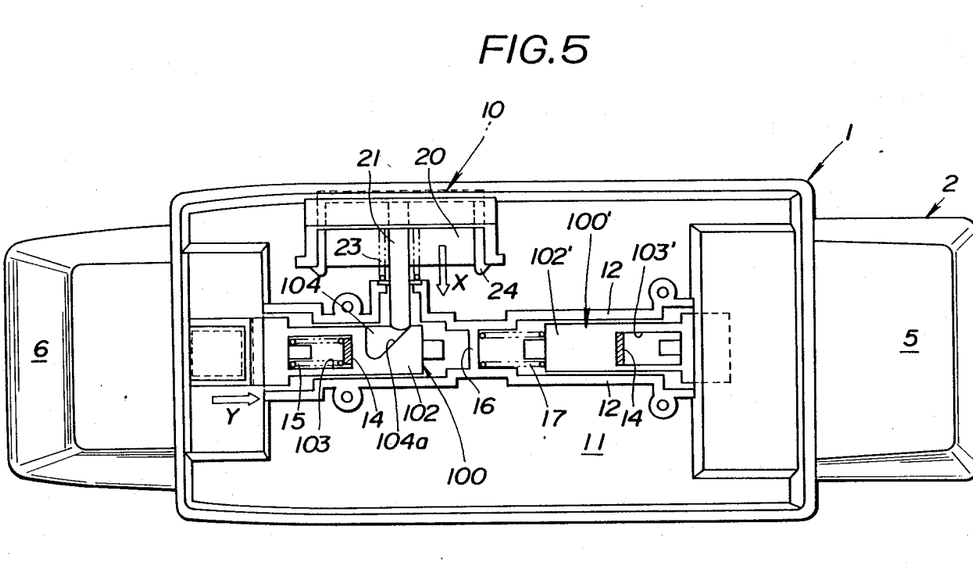
FIG. 5 is a sectional plan view of the telephone taken in line V-V in FIG. 3.
Figure 6:
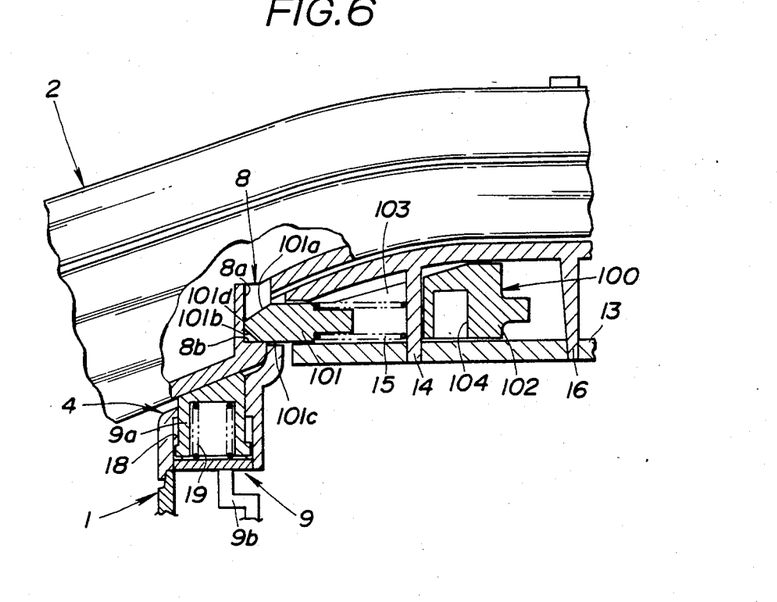
FIG. 6 is a fragmental vertical sectional view of the telephone, particularly illustrating how the handset is firmly held in position on the telephone body in the area including a cradle on the telephone sending side.

As shown in FIGS. 4 to 6, the engagement block 100 includes a block body 102 the fore end of which is designed in the form of a pawl 101. The block body 102 is formed with an elongated hole 103 in the longitudinal direction. As will be best seen in FIG. 5, a cam face 104 is formed at the position located behind the elongated hole 103 in the side wall of the block 100 (rightwards relative to the latter as seen in the drawing). Each of the engagement blocks 100 and 100' is disposed to slidably move in both the leftward and rightward directions as seen in FIG. 4, that is, in the direction at a right angle relative to the direction of mounting and dismounting of the handset 2 to and from the telephone body 1 (in the direction as identified by arrow marks W - W in the drawing) in the space as defined by the combination of a ceiling wall 11, side guide plates 12 depending from the ceiling wall 11 and a cover plate 13 bridged between both the lower ends of the side guide plates 12 of the telephone body 1. As will be best seen in FIG. 6, a tongue 14 is fitted into each of the elongated holes 103 and 103' of the engagement blocks 100 and 100' while extending therethrough. With respect to the engagement block 100 disposed on the sending side in the left-hand area as seen in FIG. 4 to function as first engagement block a compression coil spring 15 is interposed between the tongue 14 and the rear face of the pawl 101 whereby the engagement block 100 is normally biased in the leftward direction as seen in the drawing under the effect of resilient force of the compression coil spring 15. On the other hand, with respect to the engagement block 100' disposed on the receiving side in the righthand area in FIG. 4 to function as second engagement block a compression coil spring 17 is interposed between a central partition plate 16 located behind the engagement block 100' and the rear end face of the latter whereby the engagement block 100' is normally biased in the rightward direction as seen in the drawing under the effect of resilient force of the compression coil spring 17. It should be noted that the engagement block 100' on the receiving side is biased under the effect of a higher intensity of resilient force than that of the engagement block 100 on the sending side. Further, it should be noted that the pawls 101 and 101' of the engagement blocks 100 and 100' on both the sending and receiving sides are inhibited from projecting from the end faces 1b and 1c of the trapezoidal portion 1a in excess of a predetermined distance toward the area located above the cradles 3 and 4 due to the existence of the tongue 14 which is fitted into the elongated holes 103 and 103'. As shown in FIG. 6, the pawl 101 of the engagement block 100 is designed in the tapered structure including a larger inclined face 101a and a smaller inclined face 101b. Further, the engagement block 100 has an engagement face 101c on the bottom of the pawl 101, the engagement face 101c extending from the smaller inclined face 101b in the rearward direction (in the rightward direction as seen in the drawing), that is, in the direction of movement of the engagement block 100. As shown in FIG. 4, the larger inclined face 101a' of the engagement block 100' on the receiving side is oriented rightwards and extends upwardly at a certain inclination angle.

Next, description will be made below as to the hook button 9 with reference to FIG. 6. As will be apparent from the drawing, the hook button 9 includes a button body 9a vertically slidably fitted into a chamber 18 which is formed in the cradle 4 on the sending side and it is normally biased upwardly under the effect of resilient force of a compression coil spring 19 which is accommodated in the hollow space of the button body 9a. As shown in FIG. 4, the hook button 9 is provided with an arm 9b which extends downwardly of the button body 9a. A magnet 9c is fixedly attached to the lower end of the arm 9b. Further, the telephone body 1 is equipped with a lead switch 30 in the area located below the hook button 9, the lead switch 30 serving as a hook switch for switching from the operative state to the inoperative state and vice versa. Thus, a hook switch mechanism 40 is constituted by the combination of hook button 9, compression spring 19 and lead switch 30.

Figure 7:
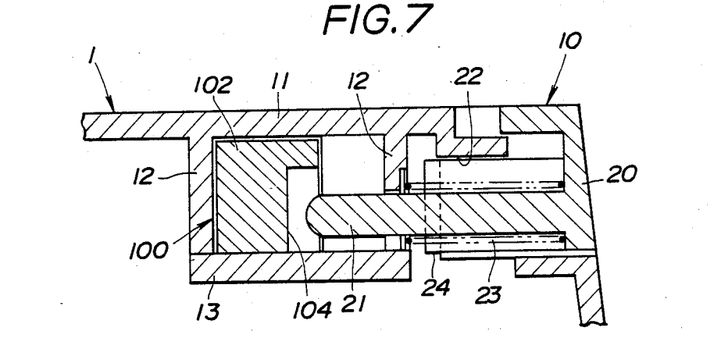
FIG. 7 is a fragmental vertical sectional view of the telephone taken in line VII-VII in FIG. 3, particularly illustrating how an unlocking button is incorporated in the telephone body.

Next, description will be made below as to the unlocking button 10 with reference to FIGS. 5 and 7. The unlocking button 10 comprises a button portion 20 and a rod 21 extending from the inside wall of the button portion 20 toward the side wall of the engagement block 100 on the sending side and the fore end of the rod 21 comes in contact with cam face 104 of the engagement block 100. The button portion 20 is slidably fitted into an opening 22 which is formed on the side wall of the telephone body 1 at the position in the proximity of the upper edge thereof, the opening 22 extending at a right angle relative to the direction of movement of engagement block 100. A compression spring 23 is interposed between the button portion 20 and the side guide plate 12 whereby the unlocking button 10 is normally biased outwardly of the body 1 (in the rightward direction as seen in FIG. 7) under the effect of resilient force of the compression spring 23. Incidentally, reference numeral 24 designate a stopper pawl which serves to inhibit the unlocking button 10 from being sprung outwardly of the telephone body 1.

As shown in FIG. 4 which illustrates the inoperative state where the handset 2 is placed on the telephone body 1, the pawls 101 and 101' of the engagement blocks 100 and 100' on both the sending and receiving sides are engaged to the engagement recess 7 on the receiving section 5 and the engagement recess 8 on the sending section 6. At this moment the fore end 101d of the pawl 101 of the engagement block 100 on the sending side comes in engagement against the rear face 8a of the engagement recess 8, while the engagement face 101c of the pawl 101 comes in contact with the engagement portion 8b of the engagement recess 8. As is apparent from the drawing, the engagement portion 8b occupies a small area in the engagement recess 8 which is located opposite to the engagement face 101c of the pawl 101. Specifically, the engagement portion 8b is designed in the form of a plane extending in the longitudinal direction of the handset 2 in the same manner as the engagement face 101c of the pawl 101. By virtue of the arrangement made in that way it is assured that the handset 2 is inhibited from being unintentionally disengaged from the telephone body 1, because the engagement portion 8b in the engagement recess 8 is locked by means of the engagement face 101c so as not to cause any upward displacement of the engagement portion 8b when an operator takes up the handset 2 from the telephone body 1. Since the sending section 6 of the handset 2 is normally urged upwardly by means of the hook button 9 as mentioned above, it results that the engagement portion 8b is brought in tight contact with the engagement face 101c of the pawl 101. Thus, there is no fear of causing rattling movement of the handset 2 under any vibratory condition. Further, since the engagement block 100 on the receiving side is biased with an intensity of resilient force higher than that of the engagement block 100' on the sending side as mentioned above, the handset 2 is caused to forcibly move in the rightward direction as seen in FIGS. 3 and 4 until the inside face 6a of the sending section 6 abuts against the left-hand end face 1c of the trapezoidal portion 1a of the telephone body 1. As a result, the handset 2 is inhibited from an occurrence of rattling movement. While the handset 2 is properly placed on the telephone body 1, the button body 9a of the hook button 9 is forcibly depressed in the chamber 18 against resilient force of the compression spring 19 by means of the sending section 6 of the handset 2, as shown in FIG. 4. At this moment the magnet 9c moves to the position located in the vicinity of the lead switch 30. This causes the lead switch 30 to be opened under the influence of magnetic force whereby the telephone becomes inoperative.

When an operator wants to take up the handset 2 from the telephone body 1, he is required to depress the unlocking button 10. When the unlocking button 10 is displaced in the direction as identified an arrow mark X in FIG. 5, the fore end of the rod 21 on the unlocking button 10 comes in slidable contact with the cam face 104 of the engagement block 100 on the sending side whereby the engagement block 100 is displaced toward the central part of the telephone body 1 in the direction as identified by an arrow mark Y. This causes the engagement face 101c of the pawl 101 of the engagement block 100 to be disengaged from the engagement portion 8b of the engagement recess 8 on the sending section 6 of the handset 2, resulting in the sending section 6 of the handset 2 being raised up under the effect of upward resilient force of the hook button 9. At this moment disengagement of the sending section 6 of the handset 2 achieved in that way is followed by disengagement of the receiving section 5 of the same. Now, the handset 2 is ready to be removed or taken up from the telephone body 1. Alternatively, removal of the handset 2 from the telephone body 1 may be carried out by displacing the handset 2 against resilient force of the engagement block 100' on the receiving side in the leftward direction as seen in FIGS. 3 and 4. Due to the fact that the pawl 101 of the engagement block 100 on the sending side is inhibited from projection into the area located above the cradle 4 on the sending side in excess of a predetermined distance because of the existence of the tongue 14, the pawl 101 of the engagement block 100 can be disengaged from the engagement recess 8 by displacing the handset 2 in the leftward direction. Thereafter, the sending section 6 of the handset 2 is raised up under the effect of upward resilient force of the hook button 9 and the sending receiving section 5 of the same is then released from the engaged state. Now, the handset 2 is ready to be removed or taken up from the telephone body 1. Further, as another method of removing or taking up the handset 2 from the telephone body 1 removal or taking-up of the handset 2 may be achieved by way of the steps of displacing the receiving section 5 of the handset 2 in the upward direction by operator's force, allowing the lower edge 7a of the engagement recess 7 as shown in FIG. 4 to come in slidable contact with the larger inclined face 101a' of the engagement block 100' on the receiving side, displacing the engagement block 100' in the leftward direction as seen in the drawing until the engagement block 100' is disengaged from the receiving section 5 and thereafter disengaging the sending section 6 from the engagement block 100. Once the handset 2 is removed from the telephone body 1 in accordance with one of the above-mentioned various methods, the hook button 9 is released from the depressed state which is maintained by the dead weight of the sending section 6 and thereafter it is displaced upwardly under the effect of resilient force of the compression spring 19. Thus, the magnet 9c is parted away from the lead switch 30 and thereby the lead switch 30 is closed. This leads to a result that the telephone becomes operative.

On the other hand, when the handset 2 is placed on the telephone body 1, it is forcibly depressed on the latter by operator's hand in such a manner that the receiving section 5 of the handset 2 is located opposite to the cradle 3 on the receiving side while the sending section 6 of the same is located opposite to the cradle 4 on the sending side. Thereafter, the pawl 101' of the engagement block 100' on the receiving side is caused to move forward beyond the inside face 5b of the receiving section 5 until it is fitted into the engagement recess 7 and at the same time the pawl 101 of the engagement block 100 on the sending side is caused to move forward beyond the inside face 6b of the sending section 6 until it is fitted into the engagement recess 8 whereby the handset 2 is firmly held on the body 1. At this moment the button body 9a of the hook button 9 is depressed into the chamber 18 by means of the projected part of the sending section 6 and thereby the telephone becomes inoperative again by turning off the lead switch 30.

Figure 8:
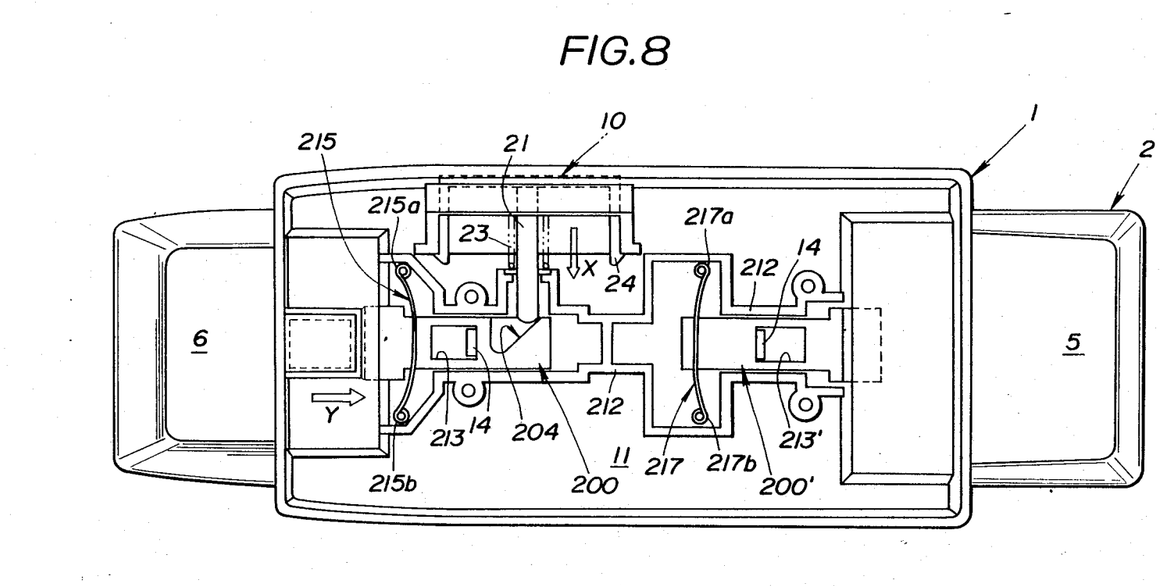
FIG. 8 is a sectional plan view of a telephone in accordance with other embodiment of the present invention, wherein leaf springs are employed as actuating means for engagement blocks.

Next, other embodiment of the present invention will be described below with reference to FIG. 8. In this embodiment the engagement block 200 for the sending side disposed leftsides relative to the side guide plates 212 as seen in the drawing is fixedly provided with a leaf spring 215. Both the ends 215a and 215b of the leaf spring 215 are attached to the ceiling wall 11 whereby the engagement block 200 is normally biased in the leftward direction as seen in the drawing under the effect of restorative resilient force of the leaf spring 215. As is apparent from the drawing, the engagement block 200 is formed with a cam face 204 on the one side wall thereof and an unlocking button 10 is disposed at the position located opposite to the cam face 204. The structure of the unlocking button 10 is entirely the same as that shown in FIGS. 2 to 7 and moreover the manner of actuating the engagement block 200 by operating the unlocking button 10 is entirely the same as that in the foregoing embodiment. On the other hand, the engagement block 200' for the receiving side disposed rightwards relative to the side guide plates 212 as seen in the drawing is fixedly provided with a leaf spring 217 and both the ends 217a and 217b of the leaf spring 217 are attached to the ceiling wall 11 whereby the engagement block 200' is normally biased in the rightward direction as seen in the drawing under the effect of restorative resilient force of the leaf spring 217. The handset 2 is firmly held on the telephone body 1 by cooperative function of the engagement blocks 200 and 200'.

Figure 9:
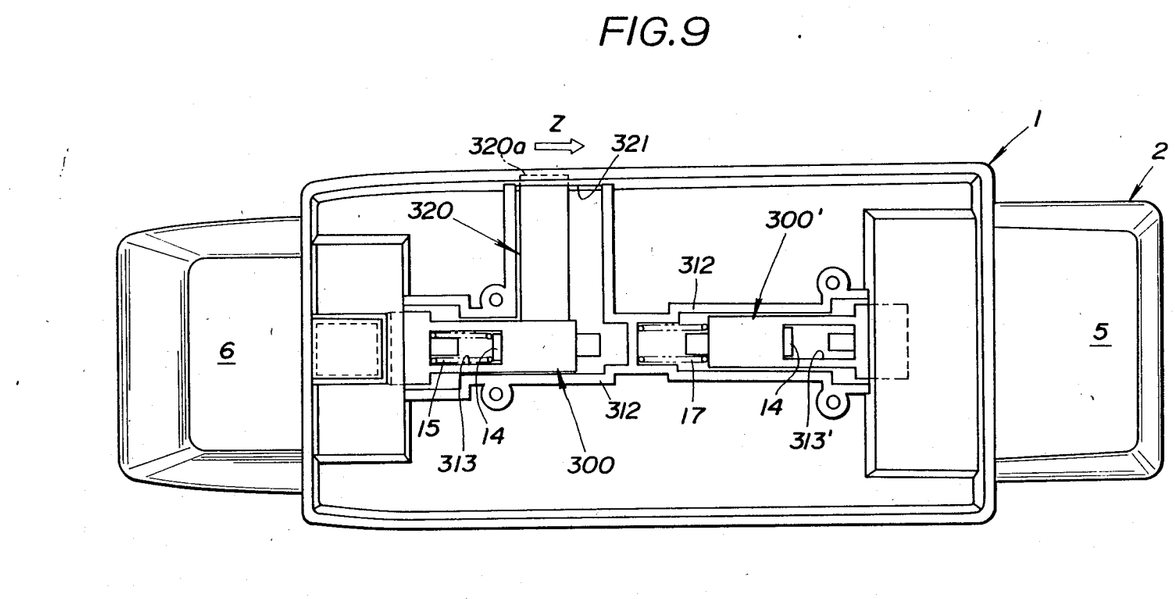
FIG. 9 is a sectional plan view of a telephone in accordance with another embodiment of the present invention, wherein the one engagement block is actuated directly by means of an actuating member.

Next, another embodiment of the present invention will be described below with reference to FIG. 9. In this embodiment the engagement block 300 on the sending side is provided with an actuating member 320 which extends from the one side wall of the engagement block 300 toward the side wall of the telephone body 1. The one end 320a of the actuating member 320 is projected outwardly of an opening 321 which is formed on the one side wall of the telephone body 1. When the end part 320a of the actuating member 320 is displaced in the direction as identified by an arrow mark Z in the drawing, the engagement block 300 on the sending side is caused to move in the rightward direction as seen in the drawing, that is, in the direction as identified by an arrow mark Z whereby the handset 2 is disengaged from the telephone body 1. It should be noted that the manner of disposing the engagement block 300' on the receiving side as well as the manner of actuating it are entirely same the as those relative to the engagement block 100' in the embodiment as shown in FIGS. 2 to 7.

Figure 10:
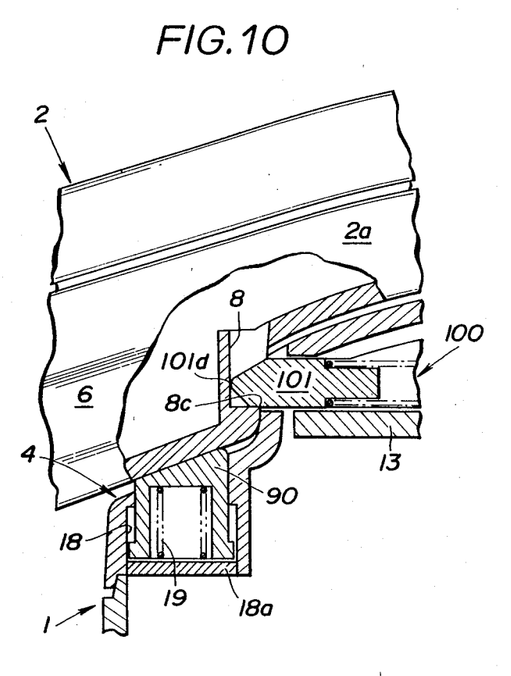
FIG. 10 is a fragmental vertical sectional view of a telephone in accordance with further another embodiment of the present invention, wherein the handset is raised up by means of a button with a compression spring accommodated therein in the area including a cradle on the sending side.
Figure 11:
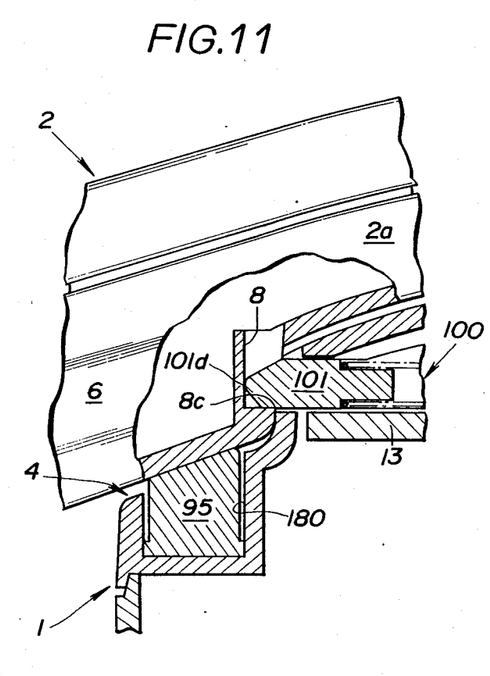
FIG. 11 is a fragmental vertical sectional view of a telephone in accordance with still further another embodiment of the present invention similar to FIG. 10, wherein the handset is raised up by means of a block made of elastomeric material in the area including a cradle on the sending side.

FIGS. 10 and 11 illustrate a modified structure in which the hook button 9 adapted to displace the handset 2 in the vertical direction in accordance with the embodiment as shown in FIGS. 2 to 7 is modified.

In the case of the embodiment as shown in FIG. 10 an arrangement is made such that a button 90 is slidably accommodated in the chamber 18 which is formed in the cradle 4 on the sending side and a compression spring 19 is interposed in the hollow space as defined between the button 90 and the bottom wall 18a of the chamber 18 in order to displace the sending section 6 upwardly by means of the button 90 under the effect of resilient force of the compression spring 19. On the other hand, in the case of the embodiment as shown in FIG. 11 a chamber 180 formed in the cradle 4 on the sending side is filled with a block 95 made of elastomeric material. The block 95 is fixedly secured to the bottom of the chamber 180 with the aid of an adhesive or the like means in order to inhibit it from being removed from the chamber 180. As will be apparent from the drawing, the block 95 is held in the compressed state under the influence of dead weight of the sending section 6 and the latter is normally urged in the vertical direction under the effect of restorative resilient force of the block 95. It should of course be understood that a distance of displacement of the button 90 from the loaded state to the unloaded state in the embodiment as shown in FIG. 10 as well as a distance of displacement of the elastic block 95 from the loaded state to the unloaded state in the vertical direction in the embodiment as shown in FIG. 11 are so determined that the lower edge 8c of the engagement recess 8 can be raised up above the foremost end 101d of the pawl 101 of the engagement block 100.

Figure 12:
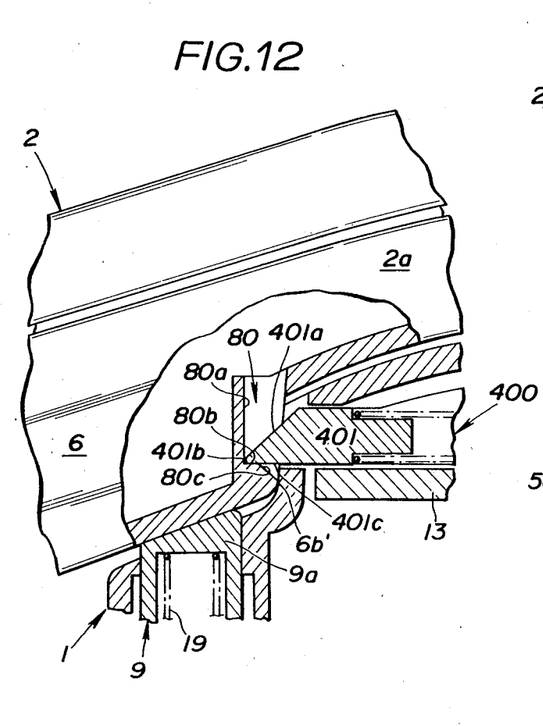
FIG. 12 is a fragmental vertical sectional view of a telephone in accordance with a modified embodiment of the present invention similar to FIG. 10, wherein a pawl and an engagement recess are designed in a different manner on the sending side.

Next, description will be made below as to other embodiment of the present invention as shown in FIG. 12. In this modified embodiment the pawl 401 of the engagement block 400 has an inclined face 401a which extends toward the foremost end 401b at a certain downward inclination angle and moreover it has an engagement face 401c which extends from the foremost end 401b of the pawl 401 in the direction of movement of the engagement block 400. On the other hand, the engagement recess 80 has a face which extends from the rear wall 80a thereof in the direction of movement of the engagement block 400 whereby an engagement portion 80b is constituted by the aforesaid face. Further, the engagement recess 80 has an inclined face 80c which extends from the right-hand edge of the engagement portion 80b at a certain downward inclination angle as seen in the drawing. While the handset 2 is held at the illustrated inoperative state, the engagement face 401c of the engagement block 400 is engaged to the engagement portion 80b of the engagement recess 80, resulting in the handset 2 being firmly placed on the telephone body 1. In this embodiment removal of the handset 2 from the telephone body 1 is achieved by way of the steps of displacing the engagement block 400 in the rightward direction by a distance corresponding to the depth of the engagement portion 80b in the engagement recess 80 and causing the foremost end 401b of the pawl 401 to move in the rightward direction in conformance with the inclined face 80c of the engagement recess 80 until it moves beyond the ridge 6b' of the sending section 6 while the handset 2 is raised up under the effect of resilient force of the hook button 9. On the other hand, placing of the handset 2 on the telephone body 1 is achieved by way of the steps of locating the sending section 6 above the cradle 4 on the sending side, depressing the handset 2 on the cradle 4 so as to allow the ridge 6b' of the sending section 6 to come in slidable contact with the tapered face 401a of the engagement block 400, displacing the engagement block 400 in the rightward direction as seen in the drawing until the foremost end 401b of the pawl 401 moves beyond the ridge 6b' and finally causing the pawl 401 to be introduced into the engagement recess 80.

Figure 13:
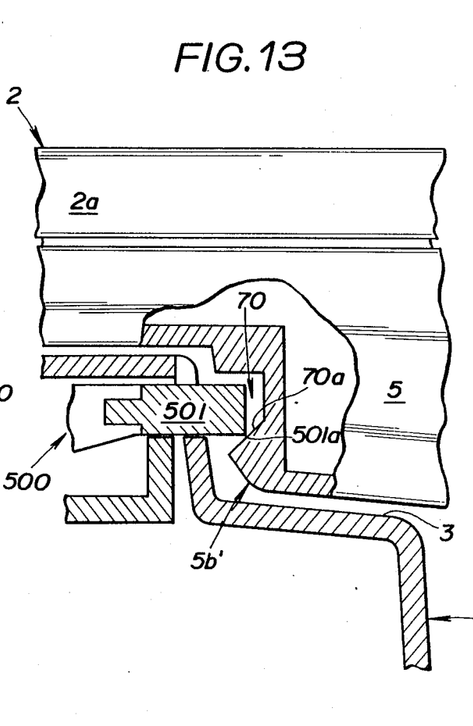
FIG. 13 is a fragmental vertical sectional view of a telephone in accordance with other modified embodiment of the present invention, wherein a pawl and an engagement recess are designed in another different manner on the receiving side.

In the case of another embodiment of the present invention as shown in FIG. 13 the engagement recess 70 in the receiving section 5 has an inclined face 70a in the lower area which extends toward the opened side (in the leftward direction as seen in the drawing) at a certain downward inclination angle. The engagement block 500 on the receiving side includes a pawl 501 of which foremost end is designed in the flat shape and the lower edge 501a of the foremost end of the pawl 501 is adapted to abut against the inclined face 70a of the engagement recess 70 whereby the handset 2 is held in position on the telephone body 1. As the handset 2 is raised up from the illustrated state, the engagement block 500 is forcibly displaced in the leftward direction as seen in the drawing by means of the inclined face 70a and thereafter the pawl 501 moves beyond the ridge 5b' of the receiving section 5. Now, the handset 2 is ready to be taken up from the telephone body 1. On the other hand, holding of the handset 2 on the telephone body 1 is achieved by way of the steps of depressing the receiving section 5 toward the cradle 3 on the receiving side, causing the ridge 5b' of the receiving section 5 to thrust the engagement block 500 in the leftward direction until the ridge 5b' moves beyond the pawl 501 and finally causing the pawl 501 to be introduced into the engagement recess 70.

Figure 14:
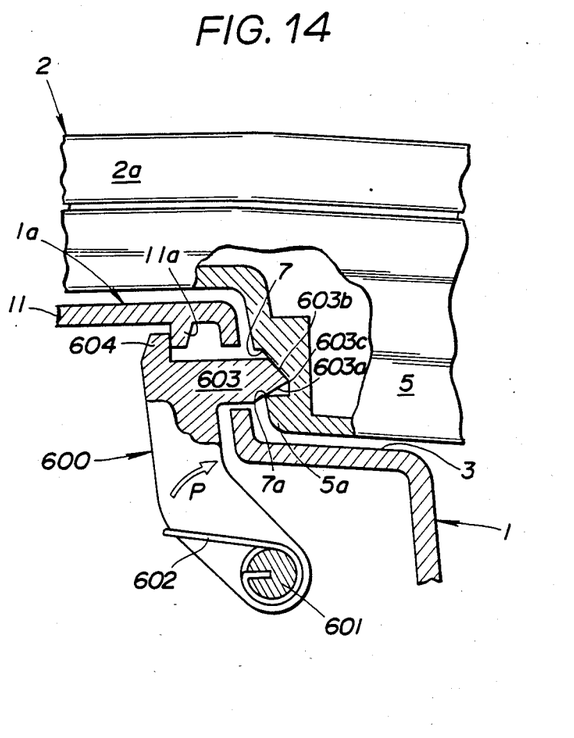
FIG. 14 is a fragmental vertical sectional view of a telephone in accordance with another modified embodiment of the present invention similar to FIG. 13, wherein an engagement block is turnably disposed on the receiving side.

Finally, description will be made below as to a modified embodiment of the present invention as shown in FIG. 14. In this embodiment an engagement block 600 on the receiving side is supported turnable about a shaft 601 which is horizontally held in the telephone body 1. The engagement block 600 is normally turned in the direction as identified by an arrow mark P under the effect of resilient force of a helical torsion spring 602 which is spanned between the shaft 601 and the engagement block 600 and a pawl 603 of the latter is projected into an engagement recess in the cradle on the receiving side. As is apparent from the drawing, the pawl 603 of the engagement block 600 includes a lower inclined face 603a which extends in the rightward direction at a certain upward inclination angle and an upper inclined face 603b which extends in the rightward direction as seen in the drawing at a certain downward inclination angle. The engagement block 600 is formed with a projection 604 which is adapted to abut against a stopper 11a on the inside surface of the ceiling wall 11 of the telephone body 1. Thus, a distance of projection of the pawl 603 outwardly of the trapezoidal portion 1a is restricted by abutment of the projection 604 against the stopper 11a in that way. To firmly hold the handset 2 on the telephone body 1 the receiving section 5 is first located above the cradle 3 on the receiving side and it is then depressed toward it. Thus, the ridge 5a of the receiving section 5 comes in slidable contact with the upper inclined face 603b of the pawl 603 whereby the engagement block 600 is caused to turn in the anticlockwise direction against resilient force of the helical torsion spring 602. When the ridge 5a moves beyond the foremost end 603c of the pawl 603, the latter is introduced into the engagement recess 7. As a result, the handset 2 is firmly held on the telephone body 1. On the other hand, when the receiving section 5 is raised up, the lower edge 7a of the opened side of the engagement recess 7 comes in slidable contact with the lower inclined face 603a of the pawl 603 whereby the latter is displaced in the leftward direction as seen in the drawing. When the ridge 5a of the receiving section 5 moves beyond the pawl 603, the latter is disengaged from the engagement recess 7. Now, the handset 2 is ready to be removed from the telephone body 1.

While the present invention has been described above with respect to typical preferred embodiments thereof, it should of course be understood that it should not be limited only to them but various changes or modifications may be made in any acceptable manner without departure from the spirit and scope of the invention as defined by the appended claims.

What is claimed is:

1. A telephone set, comprising:
   a telephone body having a base and a portion projected from said base with first and second end faces at opposite ends thereof;
   a handset detachably mountable on said telephone body, said handset having a receiving portion and a sending portion at opposite ends thereof connected by a longitudinally extending junction portion, said receiving and sending portions having opposing first and second inside faces extending from opposite ends of said junction portion to define a holding recess for receiving said projected portion of said telephone body with said first and second inside faces of said handset being respectively adjacent said first and second end faces of said projected portion, said handset being mountable on and removable from said telephone body in a projecting direction; and
   means for engaging said projected portion of said telephone body in said holding recess of said handset, said engaging means including:
   a first engagement recess having a first bottom holding face formed in said first inside face of said handset and a second engagement recess having a second bottom holding face formed in said second inside face of said handset, said first bottom holding face extending perpendicular to a projecting direction of said projected portion when the handset is mounted on the telephone body;
   first and second engagement blocks slidably disposed in said projected portion of said telephone body and extending outwardly from one of said first and second end faces of said projected portion respectively, said first and second engagement blocks having first and second pawl portions, configured to fit into said corresponding first and second engagement recesses of said handset, means for biasing said first and second engagement blocks in a direction substantially perpendicular to said projecting direction into said engagement recesses, said first and second pawl portions each including a respective first and second bottom engagement face, said first bottom engagement face extending parallel to and in opposing relation to said first bottom holding face for preventing disengagement of said first pawl portion from said first engagement recess when said handset is mounted on the telephone body, said second bottom engagement face being inclined relative to said second bottom holding face, said second pawl portion and second engagement recess engaging along a line of intersection between said second bottom engagement face and said second bottom holding face, the cooperation of the first and second pawl portions in their respective engagement recesses requiring removal of said handset from said base, by displacement of said handset in a first direction for displacing one of the first and second pawl portions out of the respective engagement recess, followed by displacement of said handset in a second direction substantially different than the first direction for displacing the other of the first and second pawl portions out of the respective engagement recess.

2. The telephone set of claim 1, wherein the first pawl portion and the first engagement recess are configured and dimensioned for permitting removal of the receiving portion of the handset upon displacement of the handset in the first direction, said first direction being a direction substantially perpendicular to said projecting direction.

3. The telephone set of claim 1, wherein the second pawl portion and second engagement recess are configured and dimensioned for permitting removal of the sending portion of the handset upon displacement of the sending portion in the second direction, said second direction being the projecting direction.

* * * * *